UNITED STATES PATENT OFFICE.

EUGÈNE AUGÉ, OF MONTPELLIER, FRANCE.

PROCESS OF CRYSTALLIZING SODA-ALUM.

SPECIFICATION forming part of Letters Patent No. 435,129, dated August 26, 1890.

Application filed February 7, 1890. Serial No. 339,588. (No specimens.) Patented in France October 19, 1889, No. 201,440; in Belgium October 21, 1889, No. 88,139; in England October 22, 1889, No. 1,671, and in Italy November 4, 1889, No. 26,409.

*To all whom it may concern:*

Be it known that I, EUGÈNE AUGÉ, a citizen of the Republic of France, and a resident of Montpellier, France, have invented a certain new and useful Process for Making Soda-Alum in Crystallized Form, (for which I have obtained Letters Patent in the following countries, to wit: in France, No. 201,440, dated October 19, 1889; in Belgium, No. 88,139, dated October 21, 1889; in Great Britain, No. 1,671, dated October 22, 1889, and in Italy, No. 26,409, dated November 4, 1889,) whereof the following is a specification.

In an application filed by me under date of June 12, 1889, being Serial No. 314,024, I have described a process of my invention for the obtaining of soda-alum in crystals under certains conditions of temperature and treatment therein respectively set forth.

My present invention has for its object the obtaining of a similar product, but by means differing from said former process and based upon my discovery of the peculiar behavior of a concentrated solution of soda-alum under certain mechanical conditions.

For the practical application of my process I add to an ordinary solution of sulphate of alumina the proper quantity of sulphate of soda, preferably free of iron, to obtain commercial soda-alum. I then heat this solution by means of a coil, or in any other manner, until a specific gravity of from 1.32 to 1.42 is reached, (corresponding to a density of from 35° to 43° Baumé.) In practice I prefer about 41° Baumé. These densities are to be taken after the solution has reached the boiling-point. When the solution has by ebullition reached a density within the range above mentioned, I run it off upon a leaden floor or other convenient surface in a layer of about four to ten centimeters in depth and allow it to cool for some hours. As soon as the cooling of the mass is complete it assumes the condition of a white paste, somewhat like very thick cream. I then take this paste and spread it in thin layers upon an inclined surface, preferably a lead-covered table having an incline of about five or six centimeters to the meter. The thickness of the layers may range between three and seven centimeters for obtaining good results. After the lapse of a time which is greater or less according to the thickness of the layers and the temperature, and which for a thickness of five centimeters and a temperature of 15° centigrade is about two and one-half or three days, the mass will be found to have become transformed into crystals, which it is only necessary to wash in the usual manner and pack for transportation. When the atmospheric temperature is too high, the crystallization is not produced, or is produced too slowly to be of practical use. When the temperature is too low, the crystallization is much quicker, but the crystals are very small and their percentage of alumina is lower. To obviate those inconveniences it is advisable to produce crystallization in a room heated, if necessary, so as to maintain a temperature between 15° and 20° centigrade. Thus is obtained a product regular in its composition and size of crystals. During the crystallizing process a certain quantity of mother-liquor is separated from the paste as the latter is undergoing transformation. This mother-liquor, which contains nearly the whole of the iron or other impurities that may be present, runs off by reason of the incline of the table, and may, if desired, be treated again after the addition, or not, of a further quantity of soda-alum solution. If iron should still be present in the soda-alum crystals, it is only necessary to refine them once or twice by melting with a steam-jet and repeating the process, as above described; but if care has been taken to precipitate the iron in the sulphate of soda and to use sulphate of alumina containing but little iron the soda-alum thus obtained will contain but little iron, if any.

I am aware that, broadly speaking, the use of sulphate of soda in an aluminous solution for the purpose of obtaining soda-alum is not new, and I do not claim the same.

The novelty of my invention resides in the fact, which I have discovered, that the pasty resultant product of a concentrated solution of sulphate of alumina and sulphate of soda can be transformed into crystals by the peculiar mechanical treatment which I have above described, and in applying an even temperature, in order to obtain crystals having always the same composition and size.

I claim—

The hereinbefore-described process of obtaining soda-alum in crystals, which consists in concentrating a solution of sulphate of alumina and sulphate of soda to a specific gravity substantially between 1.32 and 1.42, cooling the resultant mass until it assumes a pasty form, and then exposing said paste in layers upon inclined surfaces at a temperature between 15° and 20° centigrade till the mother-liquors are separated, whereby crystals of uniform composition and size are obtained, substantially as set forth.

EU. AUGÉ.

Witnesses:
PLAGNIOL,
L. VALOS.